(12) United States Patent
Palmer

(10) Patent No.: US 6,598,650 B1
(45) Date of Patent: Jul. 29, 2003

(54) HOLLOW, RIGID VANES FOR DOOR AND WINDOW COVERINGS

(75) Inventor: Roger C. Palmer, Greensboro, NC (US)

(73) Assignee: Newell Window Furnishings, Inc., Freeport, IL (US)

( * ) Notice: Subject to any disclaimer, the term of this patent is extended or adjusted under 35 U.S.C. 154(b) by 0 days.

(21) Appl. No.: 09/594,619

(22) Filed: Jun. 14, 2000

(51) Int. Cl.$^7$ ................................................. E06B 3/22
(52) U.S. Cl. ....................................................... 160/236
(58) Field of Search .............................. 160/236, 900; 156/218, 626, 308.2

(56) References Cited

U.S. PATENT DOCUMENTS

| | | | |
|---|---|---|---|
| 1,937,342 A | | 11/1933 | Higbie |
| 2,121,217 A | | 6/1938 | Ellis ............................ 156/17 |
| 2,123,010 A | | 7/1938 | Kahn ............................ 156/17 |
| 2,326,454 A | * | 8/1943 | Gentile |
| 2,590,204 A | | 3/1952 | Phillips ....................... 160/236 |
| 2,855,039 A | * | 10/1958 | Gross |
| 3,472,305 A | | 10/1969 | Lefes ........................... 160/236 |
| 3,647,317 A | * | 3/1972 | Furlong et al. |
| 4,154,889 A | | 5/1979 | Platt ............................ 428/234 |
| 4,309,472 A | | 1/1982 | Götting et al. .............. 428/224 |
| 4,352,384 A | * | 10/1982 | McCoy, Jr. |
| 4,490,425 A | | 12/1984 | Knoke et al. .................. 428/90 |
| 4,509,290 A | * | 4/1985 | Stanfield, Jr. |
| 4,519,435 A | | 5/1985 | Stier ....................... 160/166 A |
| 4,818,590 A | | 4/1989 | Prince et al. |
| 5,049,424 A | * | 9/1991 | Carden et al. |
| 5,101,876 A | | 4/1992 | Zak ............................. 160/236 |
| 5,141,042 A | * | 8/1992 | Schwaegerle |
| 5,163,951 A | * | 11/1992 | Pinchuk et al. |
| 5,273,781 A | | 12/1993 | Shu .............................. 427/176 |
| 5,297,607 A | * | 3/1994 | Beauchamp |
| 5,303,507 A | * | 4/1994 | Oille |
| 5,305,813 A | * | 4/1994 | Poole |
| 5,352,311 A | * | 10/1994 | Quigley |
| 5,355,928 A | | 10/1994 | Robertson |
| 5,466,516 A | | 11/1995 | Lutzow et al. .............. 428/282 |
| 5,482,100 A | | 1/1996 | Kuhar .......................... 160/170 |
| 5,531,257 A | | 7/1996 | Kuhar ....................... 160/168.1 |
| 5,549,149 A | * | 8/1996 | Sills et al. |
| 5,593,768 A | | 1/1997 | Gessner ....................... 428/286 |
| 5,601,132 A | | 2/1997 | Goodman .................... 160/236 |
| 5,603,369 A | * | 2/1997 | Colson et al. |
| 5,749,404 A | | 5/1998 | Colson |
| 5,797,442 A | | 8/1998 | Colson et al. ............... 160/236 |
| 5,845,690 A | | 12/1998 | Colson et al. |
| 5,897,731 A | | 4/1999 | Colson et al. ............... 156/197 |
| 5,960,850 A | | 10/1999 | Colson et al. ............... 160/236 |
| 6,153,283 A | | 11/2000 | Pierson et al. |
| 6,296,037 B1 | * | 10/2001 | Ruggles |

FOREIGN PATENT DOCUMENTS

| | | | |
|---|---|---|---|
| EP | 0 692 602 A1 | 1/1996 | ........... E06B/9/262 |
| WO | WO 96/35881 | 11/1996 | ........... F06B/9/386 |

\* cited by examiner

Primary Examiner—Blair M. Johnson
(74) Attorney, Agent, or Firm—Marshall, Gerstein & Borun

(57) ABSTRACT

A rigid hollow vane for door or window coverings includes a vane shell and an optional fabric covering. The shell is thermally formed and results in a polymer matrix at least partially enveloping fibers. In its most preferred form, the polymer matrix results from heating a batt of two types of fibers, the one type having a lower melting point than the remaining fibers, so that a rigid polymer matrix can be formed about other fibers in the batt.

12 Claims, 6 Drawing Sheets

HOLLOW, RIGID VANES FOR DOOR AND WINDOW COVERINGS

BACKGROUND OF THE INVENTION

1. Field of the Invention

The present invention relates generally to the art of coverings for doors and windows, and more particularly to the preparation of vanes which may be used for such door or window coverings. In its most preferred embodiment, the present invention relates to novel vane structures which include a rigid and hollow vane prepared from a fibrous batt which is thermally transformed into a polymer matrix at least partially enveloping fibers. The present invention relates to the use of such vanes which are treated on their exterior surface to provide a decorative appearance or to such vanes which have a fabric layer bonded to an exterior surface. The present invention also relates to a method of making such rigid, hollow vanes.

2. Description of the Prior Art

A wide variety of coverings for doors and windows are known to the art. These include very old products such as roller shades and venetian-type blinds, as well as the newer types of "soft" window coverings, including pleated and cellular blinds and shades, various light control products, Roman shades, and fabric covered vertical blinds. The latter typically include a track which extends across an opening to be covered, with trucks mounted in the track for movement by a wand device or by cords and pulleys. Vanes are attached to the truck and are pivotable about a longitudinal axis of the vanes to open them to a first position which permits light to enter a room and to a second position in which the vanes overlie one another, in which case privacy is achieved. Moreover, light weight sheer fabric sheets have been attached to thin, rigid vanes to achieve a "blind with curtain" product, one of which is described in U.S. Pat. No. 5,638,881 issued to Ruggles, et al. on Jun. 17, 1997 and entitled "Blind With Curtain", which patent is assigned to the assignee of the present invention.

Recently, a number of such vertical blind products have been proposed which include hollow, tubular fabric vanes. These can include stiffening compounds to ensure that the bottom rotates the same amount as the top, with no twist in the top to bottom relationship, to achieve an aesthetically pleasing product. It has also been proposed that such vanes have a cross-section simulating an air foil. These known vanes are preferably made from a material having diagonal, dimensional stability or memory so that they resist stretching in a longitudinal direction. It is also known that with such vanes, a reinforcing strip can be applied to an open end of the vane to provide a positive and durable attachment for supporting the vane from an operating system. Patents describing such vanes include U.S. Pat. No. 5,797,442 issued Aug. 25, 1998 to Colson, et al. for "Vanes For Architectural Covering And Method Of Making Same" and U.S. Pat. No. 5,960, 850 issued on Oct. 5, 1999 to Colson, et al. for "Vane For An Architectural Covering".

The vanes used in one embodiment in the aforementioned Colson, et al. patent have a cross-sectional configuration best illustrated in FIG. 6B of the '442 patent, i.e. one resembling an air foil. Various techniques are described for ensuring that the shape is maintained, such as the use of stiffening compounds, or in the embodiment shown in FIG. 12, the use of a resilient rubber strip along the inside of the blunt end of the vane. Various single and double thickness vanes, and further vane structures, are disclosed in PCT International Application No. WO96/35881 to the same inventors, which application claims priority to the parent application of the aforementioned '442 Colson, et al. patent.

FIG. 1 of the Colson, et al. patent discloses a vertical arrangement in which a plurality of the vanes are suspended from a track 30 and are pulled across the opening to be covered using a wand. The vanes may be rotated to an open, light-admitting position as shown in FIG. 1, or to a privacy position as shown in FIG. 3. If the vane is constructed from transparent or sheer materials, light can be emitted in a diffused pattern into the room when the vanes are in the closed position, as illustrated in FIG. 4 of this patent. An important characteristic of this patent series, however, is that the material used for the vanes be flexible, even in embodiments which are described as "laminates", where a functional interior layer is applied to a decorative exterior layer. There is no teaching or suggestion in the Colson, et al. patent family of using such air foil vanes in horizontal systems, as would be predicted since the flexible nature of the vanes would cause the vanes to sag and destroy the aesthetics thereof.

The assignee of the present invention has filed an application for a "Foam Core Vane For Door And Window Covering", on Aug. 10, 1999 in the name of Bryan K. Ruggles and granted Ser. No. 09/371,226. In this application, hollow vanes are filled with a foam material, such as urethane and polyisocyanurate foams, to cause the vanes to be sufficiently rigid to allow them to be used in a variety of door and window coverings. A polymeric foam is placed inside of a fabric sleeve in a mold which fills to the desired air foil cross-sectional shape when the foam expands. This patent application mentions the use of the foam core vanes in horizontal systems.

While new window coverings are shown in these various aforementioned patents and applications, including a variety of different and useful door and window coverings employing foil shaped vanes, it would be desirable to provide such vanes in a rigid configuration which provide thermal benefits (a feature provided by the foam core vanes), as well as greater structural integrity and resistance to damage in more severe end use applications. It would also be desirable to provide vanes heretofore used principally for vertical blind applications in various horizontal configurations.

FEATURES AND SUMMARY OF THE INVENTION

A primary feature of the present invention is to provide a new, hollow and rigid vane for door and window coverings.

Another feature of the present invention is to provide methods for manufacturing new, hollow and rigid vanes for door and window coverings.

A different feature of the present invention is to provide improved vanes for door and window coverings which may be hung horizontally or vertically.

Another feature of the present invention is to provide vanes for door and window coverings which have high insulation characteristics when the vanes are in a position in which they overlap one another.

Yet another feature of the present invention is to provide vanes for door or window coverings which may include a wide variety of exterior covering materials.

How the foregoing and other features of the present invention are accomplished will be described in the following detailed description of the preferred and alternate embodiment, taken in conjunction with the FIGURES.

Generally, however, the features are provided in a vane which, in the most preferred embodiment has a cross-section that is generally in the shape of an air foil and which includes a rigid component prepared from a felt batt which includes at least two types of fibrous material. A first fiber has a lower melting point than the remaining fibers in the batt. The shell of the vane of the present invention is formed by thermally treating the batt at a temperature above the melting point of the low melt component, so that a polymer matrix is formed which at least partially envelopes the high melt fibers. The vanes may be manufactured by placing the batt material into a mold and thermally treating the batt while compressing the batt to form the polymer matrix. If the shell of the vane is to be covered by a fabric for decorative or other purposes, the fabric is preferably adhered to the batt prior to the thermal treating and molding operations. Alternatively, the fabric can be added after the shell has been formed. An adhesive may be used to apply the fabric to the shell at whatever stage in the process it is applied. The vanes, after leaving the mold, are cooled and cut into the desired length by a cutting means, such as a rotating knife, and are further converted for the particular end use. The features are also accomplished using preferred and described hanger systems, edge trimming processes, end caps to enhance thermal properties and vane shapes which enhance the light blocking properties of a finished system. Other ways in which the above and other features of the invention are accomplished will become apparent to those skilled in the art after they have read the remainder of this specification, such other ways falling within the scope of the present invention if they fall within the scope of the claims which follow.

DESCRIPTION OF THE DRAWINGS

In the various FIGURES, like reference numerals are used to indicate like components.

DETAILED DESCRIPTION OF THE PREFERRED EMBODIMENT

Figure 1:
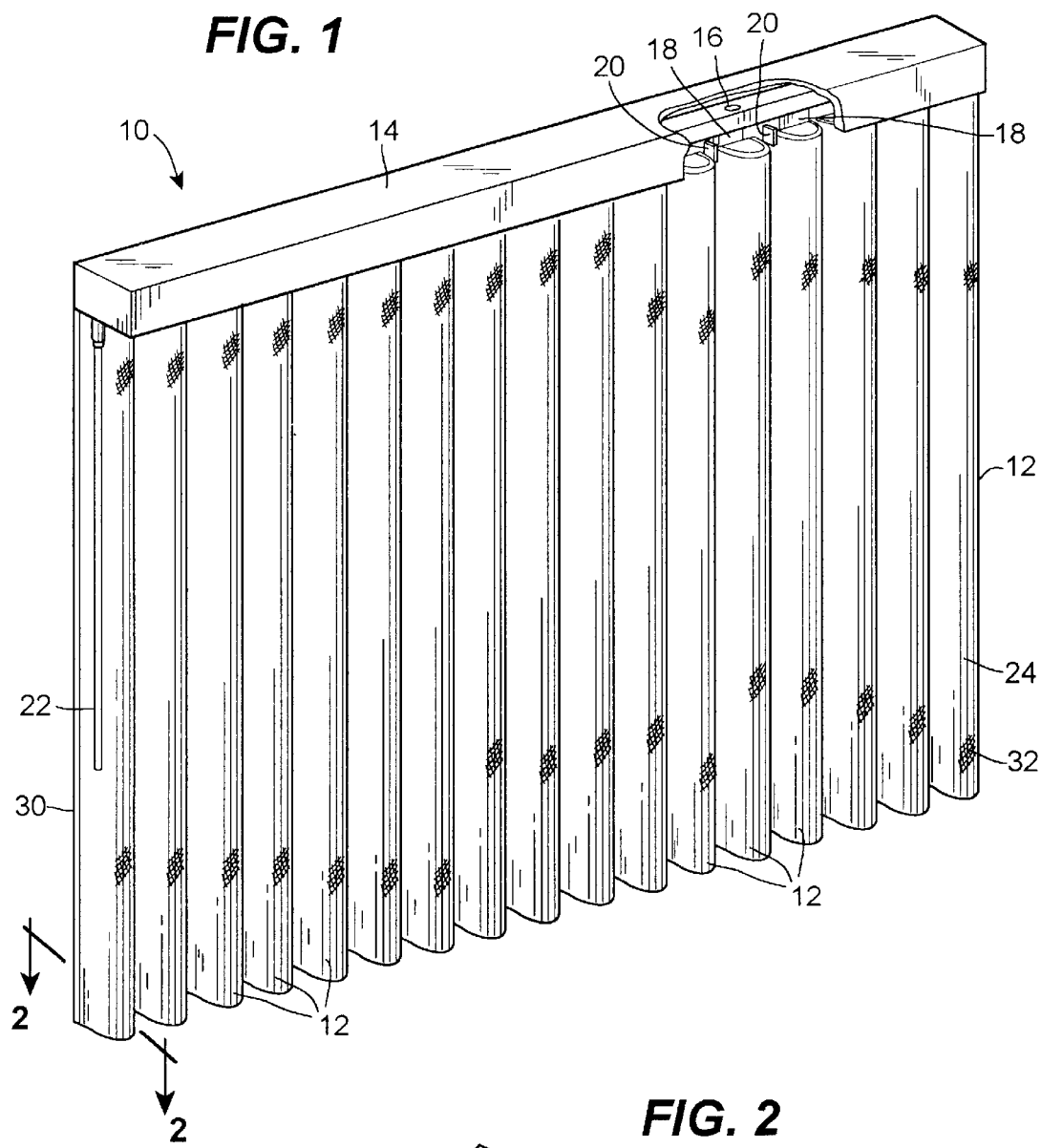
FIG. 1 is a perspective view of a door or window covering with which the vanes of the present invention may be employed.

Before beginning the description of the preferred embodiment of the present invention and alternate embodiments thereof, several general comments should be made about the applicability and the scope of the present invention.

First, while the illustrated embodiment shows the vanes in a vertical blind, the vanes could also be used in conjunction with other window covering designs known in the art, including the blind with curtain described in the aforementioned Ruggles, et al. patent or in various light control products in which one or two sheer fabrics are attached to the forward and/or rear edges of the vanes.

Second, while the illustrated embodiment shows the vanes deployed in a vertical orientation, the vanes can be used in horizontal systems, either with or without sheer fabric strips or sheets attached thereto. For example, the vanes could be manipulated and supported in the way typically practiced for venetian or mini-blind products, in which products a head rail and bottom rail are used, together with lift cords for altering the distance between the bottom rail and the head rail.

Third, the cross-sectional shape of the vanes can also be widely varied (several are illustrated) without departing from the intended scope of the invention. The air foil shape used in most of the illustrated embodiments is for purposes of illustration, rather than limitation. The vanes can be symmetrical or asymmetrical, oval, in a configuration in which the vanes come to sharper points at both the forward and rearward edges than those illustrated, vanes in which the cross-sectional shape is square, triangular or rectangular, and in connection with the latter, rectangles in which the shell is quite thin so that the vanes resemble the type of slat vanes used with present day vertical blinds, or in other cross-sectional shapes, such as S-shaped.

Fourth, the hardware used with the vanes of the present invention will not be described in detail because, in and of itself, the hardware does not form part of the present invention. Accordingly, such devices as the head rail, tracks, trucks, wands, pivot systems and systems for raising and lowering or opening or closing horizontal or vertical blinds may be selected from any of those previously known or subsequently developed as alternatives for present day products. Specifically, however, cordless systems, such as those described in U.S. Pat. No. 5,531,257 issued Jul. 2, 1996 and U.S. Pat. No. 5,482,100 issued on Jan. 9, 1996 to Kuhar and assigned to the assignee of the present invention, may be employed, i.e. systems which eliminate lift cords to be manipulated by the operator and the potential for injury to children or pets caused by the pull cords previously used for horizontal blind systems.

Fifth, the vanes of the present invention may include the thermally treated batt material itself, which material may have pleasing aesthetic properties or may be painted, printed or otherwise decorated for use as a finished vane. In other instances, however, and in most applications, the thermally formed vane will have an exterior coating of a fabric which may be selected from woven and non-woven fabric materials of the type already known in the blind and door and window covering art, including polyesters, polyolefins, rayons, etc. The covering may be a natural fabric made from cotton, linen, silk, wool or synthetic fabric materials or mixtures thereof. The fabric need not have any particular thickness or dimensional stability properties because the fabric will be typically adhered to the vane prepared from the batt by an adhesive or other bonding technique. It is also within the scope of the present invention to use composite fabric starting materials, so that different sides of the final vane will have different properties, such as color, light reflectancy, color-fastness and the like. For example, composite fabric strips are known in the window covering art and are described, for example, in European Published Application No. EP 0 692 602 A1 (published Jan. 17, 1996 Bulletin 1996/03) issued to the assignee of the present invention and describing the preparation of starting materials for cellular and light control products. This particular starting material is made by welding, such as by sonic welding, adjacent edges of fabric strips of two different types together. In that published application, the selection of the fabric is generally made based on cost, so that lower cost, non-woven materials can be used for the exterior of the door or window covering, and more expensive designer materials can be used for the portion of the product facing to the inside. Depending upon the final use of the vanes of the present invention, the same considerations that govern the choice of materials in that published application could also be used for the selection of starting materials for vanes manufactured hereunder.

Sixth, in either of the configurations noted in the previous paragraph, i.e. with or without a fabric covering, the vanes of the present invention may be treated with various additives such as flame or dust retardants, optical brighteners and other treatments known in the fabric care art. Moreover, while the preferred batt material to be used in the present invention is comprised of two polymeric fibers intermeshed with one another and having different melting points, more than the two fibers may be employed, including fibers which are not thermoplastic and which may be added for strength or aesthetic reasons, all without departing from the intended scope of the invention. Moreover, the rigid, hollow vanes of the present invention could be filled with foam material utilized in the manner taught in U.S. Application Ser. No. 09/371,226 filed Aug. 10, 1999 in the name of Bryan K. Ruggles and entitled "Foam Core Vane For Door And Window Covering". The foam which could be used with the rigid vanes of the present invention include polyurethane and isocyanurate foams or other foams which can be formed in situ or can be inserted manually into the vanes.

Proceeding now to a description of the preferred embodiment of the invention, FIG. 1 illustrates a door or window covering 10 made from a plurality of elongate vanes 12. In the illustration, a valance 14 extends across the top of the opening to be covered, and a cut-away portion of the valance shows a track 16 mounted behind the valance on the wall or ceiling. Trucks 18, one for each of the vanes 12, are mounted for sliding movement along track 12, trucks 18 being interconnected with chains or other mechanisms (not shown) to maintain a preselected spacing between the trucks 18 when the door or window covering is fully deployed across the opening as shown in the illustration. A clip 20 is provided at the top of each vane 12 for attaching the vanes 12 to the trucks 18. Another connection technique includes providing a rigidified strip around the top opening of the vanes 12 and providing an aperture therein to be placed over a hook on the trucks. A wand 22 is also shown in FIG. 1 for deploying door or window covering 10 to an open position (as illustrated) wherein the trucks 18 and vanes 12 are spaced apart from one another, or a closed position (not shown) in which the trucks 18 and vanes 12 are bunched together at one side of the opening. Wand 20 could also be used for causing the clips 20 to rotate, causing a 90° movement of each of vanes 12 from the FIG. 1 position, typically when the door or window covering 10 is fully deployed over the opening. It should be appreciated then that in such rotated positions, the vanes 12 will overlap one another, at least partially, providing light control and privacy. As previously mentioned, the rotation of the vanes can be accomplished in a variety of well-known ways, such as by using beaded chains and pulley mechanisms.

Figure 2:
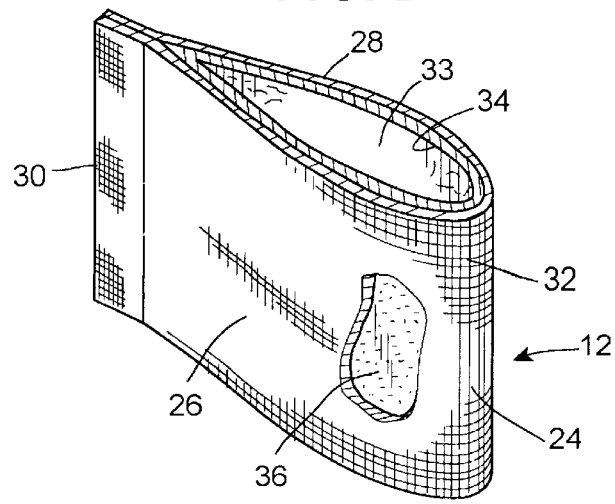
FIG. 2 is a cross-sectional view taken along the line 2—2 of one of the vanes of FIG. 1.

A cross-sectional view of a vane 12 according to the preferred embodiment of the invention is illustrated in FIG. 2. Vanes 12 are preferably shaped like an air foil having a blunt forward edge 24, a pair of gently curving sides 26 and 28, and a tapered, pointed edge 30. It will be appreciated from this drawing that the illustrated vane 12 includes an outer fabric covering 32, a hollow center 33 and a vane shell 34. The vane shell 34 defines the shape of the vane 12, i.e. as in an air foil, and the fabric covering 32 is secured thereto using an adhesive 36 (shown in the cut-out portion of this FIGURE). As mentioned previously, the vanes of the present invention do not need to have a fabric covering and, from FIG. 2, it can now be appreciated that the exterior surface of the vane shell 34 can be prepared in any desired color or it could be painted, printed or otherwise decorated for use, as is.

It now should also be appreciated that the portions of the fabric covering 32 which are nearest the pointed edge 30 may be attached to one another (again using the adhesive 36). Other techniques for joining the fabric to the vane and to itself are discussed below. Moreover, the fabric shell could be extended to the very rear edge 30 of the vane 12, with one edge of the vane shell 34 being attached to the other by any of the techniques previously mentioned. In other words, it is not necessary that two layers of the fabric covering 32 form the pointed edge 30.

With regard to the preferred materials used in the present invention, the adhesive may be selected from a wide variety of adhesive types, including those using catalysts, those which are dried by heat or contact with air, two-part adhesives, hot-melt adhesives and the like. If a hot-melt adhesive is employed, it should have a melting point low enough that no other component of the vane would be degraded, and in one embodiment of the invention, the low-melt adhesive is made from the same material as the lowest melting fiber component of the starting batt to be described below. It would readily be appreciated then that the temperature used for applying that adhesive would be compatible with the temperatures used to form the vane shell 34. The adhesive may be applied first to the fabric or may be applied first to the batt or as a web between the two fabrics or to the finished vane shell 34 as discussed below. A preferred adhesive is a web thermoplastic adhesive manufactured by Bostick, located at Middleton, Mass. and sold under product code PE 120. This web material has a melting point of about 250° F. to 325° F.

The batt material 41 which is used in the preferred form of the invention is manufactured by Felters Group located in Roebuck, S.C., 29376. The batt consists of 30% low melt fibers having a melting point at 230° F. and 70% high-melt fibers having a melting point at about 480° F.

Figure 3:
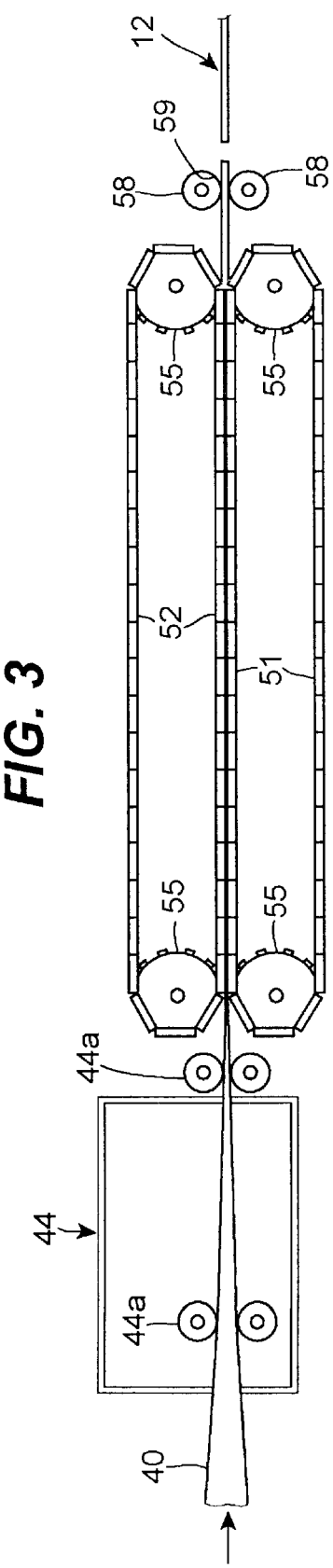
FIG. 3 is a top schematic view of a manufacturing method and apparatus for preparing the vane shells used in the most preferred form of the present invention with a fabric covering.
Figure 4:
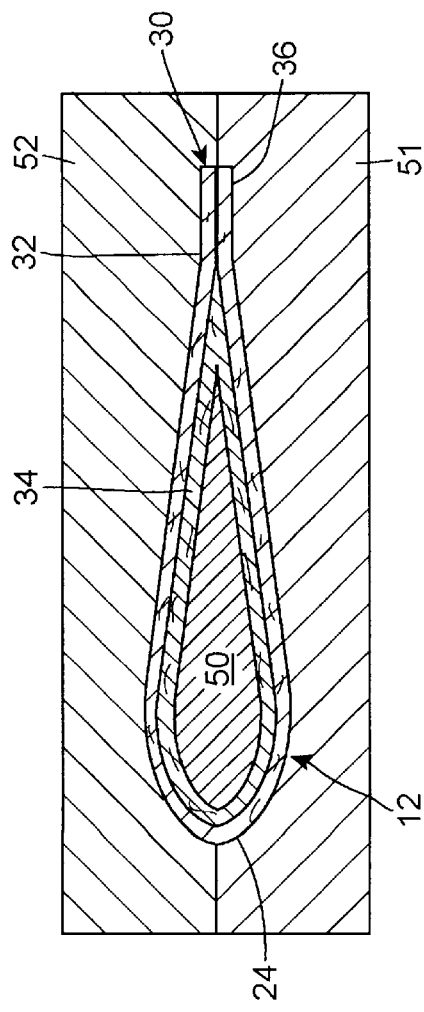
FIG. 4 is a cross-sectional view taken along the line 4—4 of FIG. 3.

One preferred manufacturing method for preparing vanes 12 is illustrated in FIGS. 3 and 4. The illustrated method includes the use of a fabric covering 32 which is applied to a starting batt 41 by adhesive 36 before any forming operations are carried out. The thicknesses and other size and dimensional relationships shown in this FIGURE should be regarded more as illustrative than limiting, because the adhesive layer 36 will typically be very thin and the batt 41 may be relatively thicker than shown. It should also be repeated here for purposes of emphasis that the fabric covering 32 can be applied after the vane shell 34 is formed, or it can be eliminated in its entirety, without departing from the spirit and the scope of the present invention. Moreover, the particular type of forming apparatus could also vary from manually folding the heated batt material about a suitable die, to highly automated systems including components for applying adhesive and warming, forming, cooling and converting the vane shell 34. Hence, the illustrated apparatus is schematic and the details of suitable manufacturing processes could be readily developed by those skilled in the art after they read and understand the present specification.

Figure 3A:
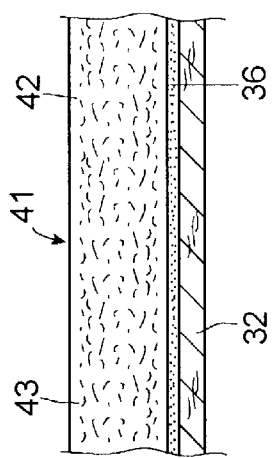
FIG. 3A is a partial sectional view of a starting laminate used for preparing a vane shell.
Figure 3B:
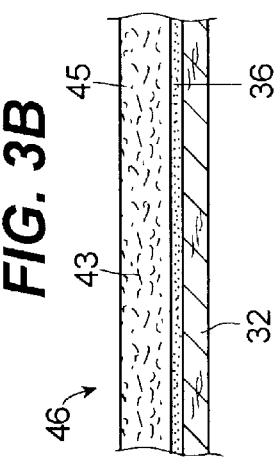
FIG. 3B is a partial sectional view of the starting laminate after thermal treatment.

FIG. 3A shows an initial starting laminate 40, to include batt 41 comprised of a mixture of at least two types of fibers 42 and 43. While in the preferred embodiment, both fibers are thermoplastic fibers, at least fibers 42 are thermoplastic and have a melting point which is lower than the melting point of the remaining fibers 43 (and any additional fibers which may be in the batt 41). In the most preferred form of the invention, the fibers 42 have a melting point within the range of 200°–350° F., while the fibers 43 would have a melting point of at least 10°, and preferably at least 25° F. higher than that of fibers 42. The initial laminate 40 is fed through a heating zone 44 by one or more pairs of feed rollers 45 located along the length of the apparatus shown in FIG. 3 to propel the laminate in its various stages from the left side of the FIGURE toward the right. The temperature of the heating zone 44, and the speed with which the material moves through the apparatus shown in FIG. 3, is selected so that while in the heating zone 44 the low melt fibers 42 are at least partially melted, such that a polymer matrix 45 is formed which at least partially envelopes the fibers 43. A schematic illustration of a laminate material 46 leaving heating zone 44 is shown in FIG. 3B where the polymer matrix 45 and the higher melt fibers 43 are at least partially enveloped thereby.

While the polymer matrix 45 resulting from the melting of fibers 42 is still warm enough (and it should be noted that the heating chamber could extend for a greater distance along the apparatus than is shown in FIG. 3), the reduced thickness laminate 46 is molded about an air-foil shaped molding die 50. The laminate 46 is folded up and around die 50 by right and left side forming elements 51 and 52. Elements 51 and 52 are driven by rollers 55 and form the exterior containment for vane 12 while it passes toward the right as shown in FIG. 3. During passage of the laminate 46 toward the right as shown in FIG. 3, the polymer matrix 45 is cooled to the point that it becomes more stiff and rigid as it approaches the outlet end of the mold forming section. At that point, the vane is cut to suitable length at a pair of rotating rollers 58, at least one of which includes a knife 59.

After the vane sections leave the apparatus schematically illustrated in FIG. 3, the vanes are processed, punched, painted, decorated or otherwise converted for use in horizontal or vertical vane systems as discussed generally above. It should be pointed out that when the vane 12 leaves the forming section of the apparatus shown in FIG. 3, the core thereof will be hollow, but the vane 12 is rigid due to the nature of the polymer matrix 45 at least partially enveloping fibers 43.

Figure 6:
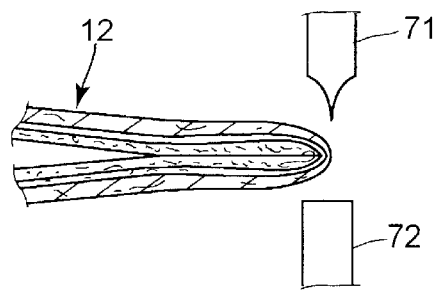
FIG. 6 is a schematic illustration of an edge trimming process to eliminate a white line at the thin edge of a vane.

FIG. 6 illustrates schematically another manufacturing process where the shape of the material is shown below the production line. A roll of slit fabric 60 is fed to a pre-heat section 61 where the polymer matrix 45 formation begins. Folding dies 62 form a generally U-shaped intermediate 63 which is then closed by folding dies 64 to form the airfoil shape. Downstream of folding dies 64, shorter folding dies 65 permit the thin edge 32 of vane 12 to protrude upwardly where a seal is provided by an ultrasonic horn 66 and a rotary anvil 67. A cooling section 68 is provided thereafter, and a rotary saw 69 ultimately to cut the slats 12 to a desired length. In this embodiment, no internal die is used.

In addition to the use of the automatic apparatus and materials shown in FIGS. 3, 3A, 3B and 4, the vane 12 could be prepared manually by using the same starting materials illustrated in FIG. 3A, warming them to a desired temperature to form the polymer matrix 45 at least partially enveloping some of the fibers 43 and manually wrapping the softened material around a molding die such as is shown at 50 in FIG. 4. In this manner, slats of the desired length could be prepared and require only trimming and converting operations before final use.

As mentioned earlier, the vane 12 is entirely suitable for use as shown in FIG. 1, but additional insulation could be added thereto by filling the hollow space 33 with a foam, either by injecting foam forming ingredients therein or by sliding a molded foam insert into space 33.

Figure 5:
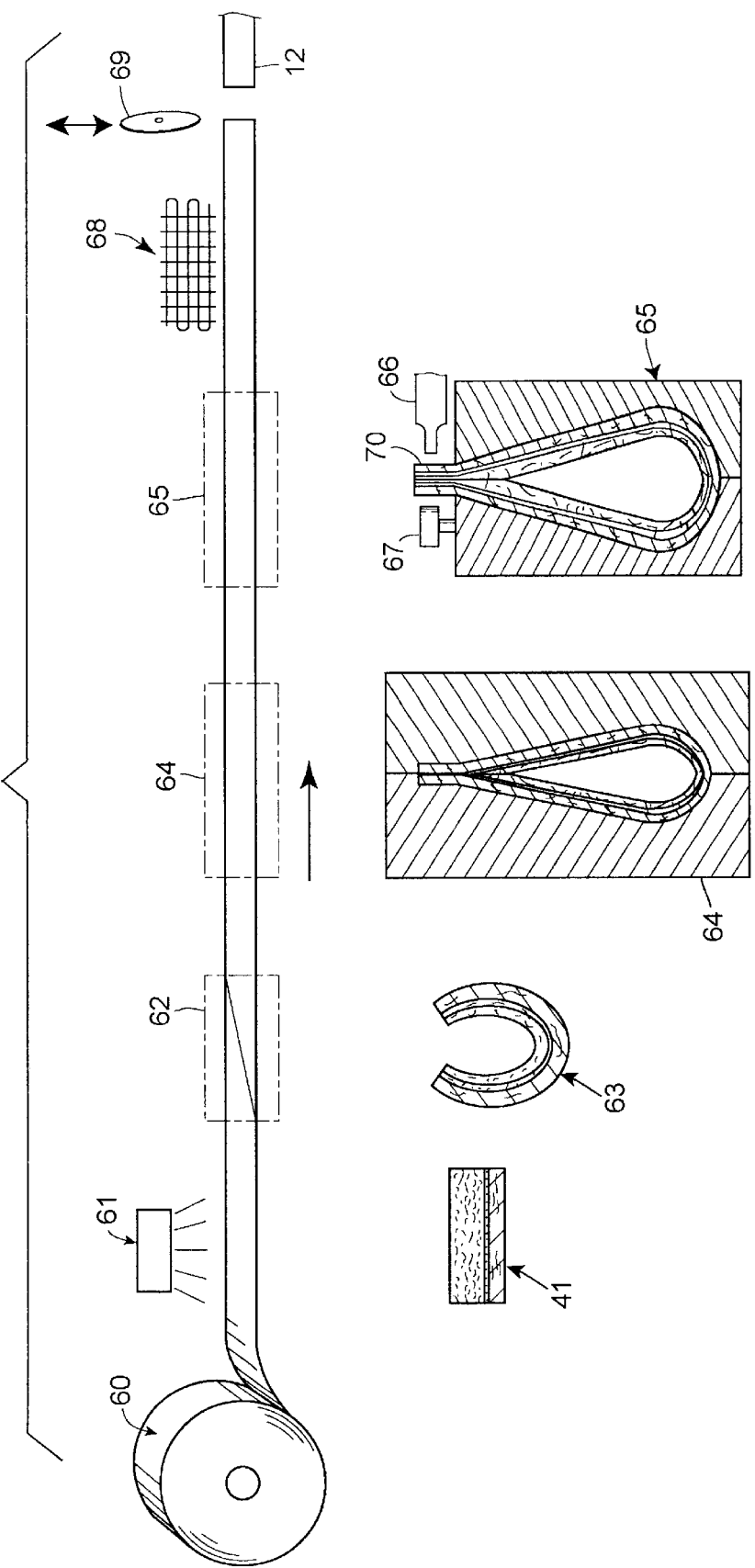
FIG. 5 is a schematic illustration of a different manufacturing process.

One modification which improves product appearance is to finish the thin edge 30 of vane 12, such as by heat slitting it as is shown in FIG. 6. It will be appreciated by reference to FIG. 5 that the thin edge 70, when viewed from the top, will display two outer layers of the fabric 26 and an inner core of the polymer matrix 45 at least partially enveloping the high melt fibers 43. The starting batt will typically be white, and this contrast may not be desirable from an appearance standpoint. By heat slitting as illustrated in FIG. 6, using a heat slitter 71 and an anvil 72, the fabric 26 is taken to the edge of the seam and provides a better looking product.

Figure 7A:
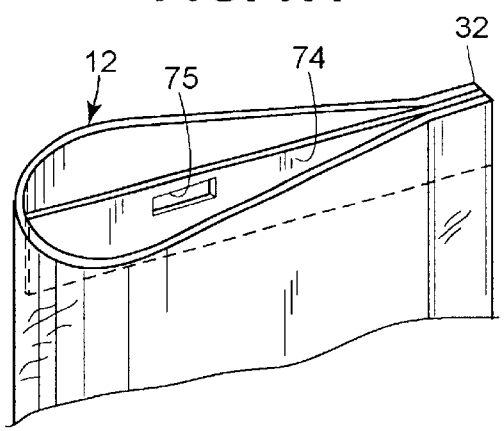
FIGS. 7A–7C show alternate embodiments of hanger devices for attaching vanes to vertical blind carrier trucks.
Figure 7B:
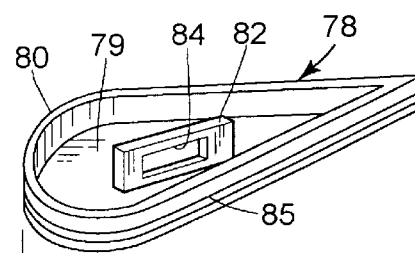
Figure 7C:
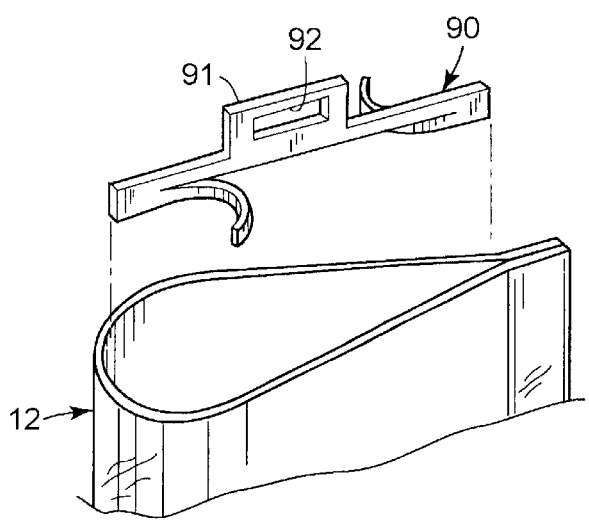

While attachment of the vanes 12 to trucks used in vertical blind systems may employ a variety of equipment already known to the art, FIGS. 7A–7C show several preferred attachment systems.

In FIG. 7A, a strip 74 extends from the thin edge 30 to the rounded edge 32, a window 75 being provided for coupling the strip 74 to a hanger of a truck (not shown).

A top plug 78 version is shown in FIG. 7B, the plug 78 being sized and shaped to fit within the upper portion of vane 12. It includes a bottom 79, an air foil shaped wall 80 and a raised tab 82 having an attachment window 84 therein. The plug 78 would preferably be adhesively bonded to the vane 12, using for example an adhesive glue pocket 85 encircling wall 80.

A spring form 90 is shown in FIG. 7C, again having a tab 91 and window 92 for attachment to the vertical blind carrier trucks.

Figure 8:
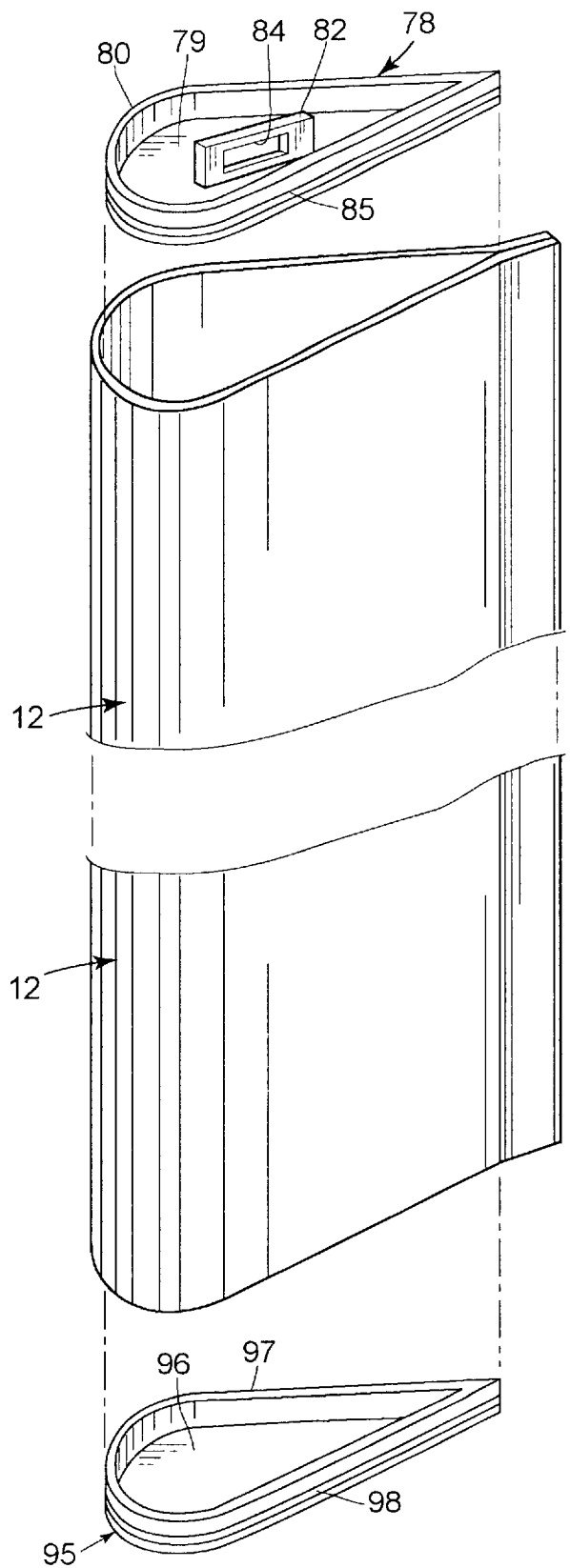
FIG. 8 illustrates the use of a bottom cap for the vanes.

Another modification of vane 12 is illustrated in FIG. 8 where a bottom cap 95 is provided. It includes a bottom 96 and a wall 97 sized to extend into (or alternatively around) the lower end of vane 12. When used with top plug 78, for example, a dead air space is provided within vane 12, increasing the insulation properties thereof.

Figure 9A:
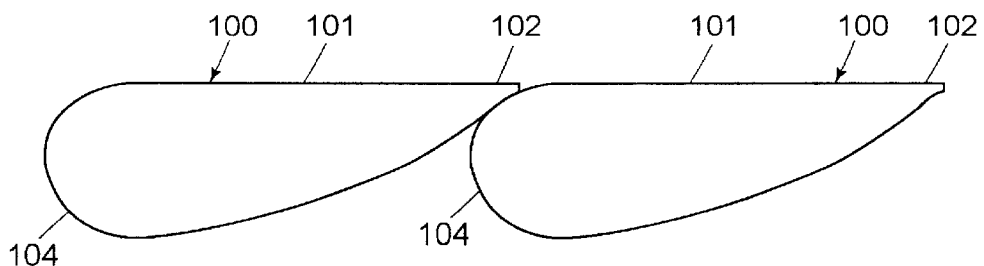
FIGS. 9A–9C show cross-sections of three exemplary shape modifications for the vanes of the present invention to decrease light gaps therebetween.
Figure 9B:
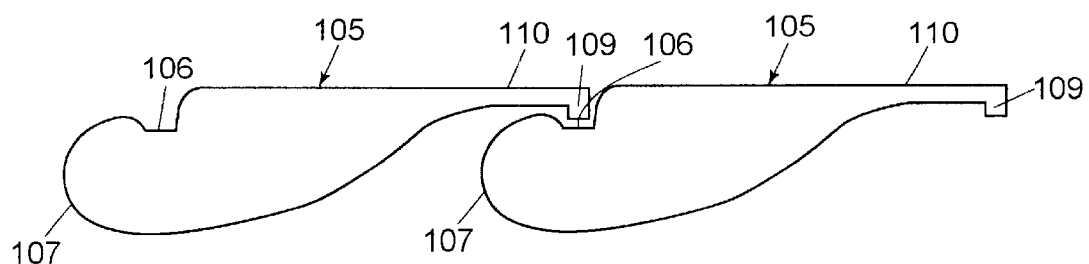
Figure 9C:
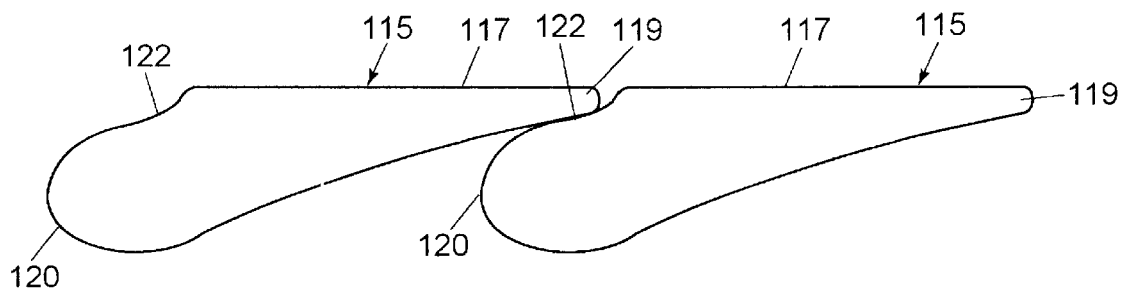

Finally, FIGS. 9A–9C show three pairs of vanes 12 in cross-section and illustrate alternatives for enhancing the light blocking characteristics thereof. In FIG. 9A the vanes 100 include a flat back 101 and non-symmetrically thin tail sections 102, so that when in a closed position the forward edge 104 lies closely adjacent the tail section 102. In FIG. 9B, vanes 105 include a notch 106 in their forward end 107 and a protrusion 109 formed at their thin edges 110 to provide a "locking" engagement when in a closed position. FIG. 9C shows a modification in which vanes 115 include a flat back 117, an asymmetrically formed thin edge 119 and a forward edge 120 which includes a smoothly curved recess 122 to accommodate edge 119. Numerous other configurations could also be used to accomplish this type of light blocking improvement.

The foregoing invention has been described in connection with a preferred embodiment and reference is made to several alternative embodiments thereof which are within the scope of the invention. Accordingly, the invention is not to be limited by any particular reference to drawings, especially with regard to size, dimensions, thicknesses or particular materials, etc., but is to be limited solely by the scope of the claims which follow.

What is claimed is:

1. A rigid vane for a door or window covering, the door or window covering including a plurality of such vanes, each of the plurality of vanes being movable between a light passing first position and a light blocking second position, the rigid vane comprising an elongate vane shell including a polymer at least partially enveloping a plurality of fibers, the vane shell having an inner surface and an outer surface, and a space within the vane shell and defined by the inner surface, each vane shell having a rounded edge extending along the length thereof and a thin edge extending along the length thereof and remote from the rounded edge thereby defining an airfoil shape in transverse cross-section that facilitates the passage of light when the vane is in the first position and inhibits the passage of light when the vane is in the second position.

2. The vane of claim 1 further including a fabric covering about at least a portion of the outer surface of the vane shell.

3. The vane of claim 1 including plugs in each end of the vane to create a dead air space therein.

4. The vane of claim 2 wherein the fabric covering is adhered to the outer surface by an adhesive.

5. The vane of claim 2 wherein the fabric covering includes first and second edges and an intermediate portion, the intermediate portion extending about the outer surface of the vane and the first and second edges extending beyond the vane and being attached to one another.

6. The vane of claim 5 wherein the first and second edges are attached to one another by an adhesive.

7. The vane of claim 1 wherein the polymer is a thermoplastic resin.

8. The vane of claim 1 wherein the fibers comprise a thermoplastic resin.

9. The vane of claim 8 wherein the polymer has a melting point less than the melting point of the fibers.

10. The vane of claim 1 wherein the polymer includes other thermoplastic resin fibers having a melting point less than that of the plurality of fibers.

11. The vane of claim 10 wherein the melting point of the other thermoplastic resin fibers is between about 200° F. and 350° F.

12. The vane for use in a vertical door or window covering, the vane comprising an elongate vane shell including a polymer matrix, the polymer matrix including thermoplastic fibers enveloped in a thermoplastic resin, the vane shell having an inner surface, and a plug located within one end of the vane, the plug having a hanger tab, the tab being adapted to be coupled to a carrier truck of a vertical blind system, and a plug for a lower end of the vane to create a dead air space within the vane.

* * * * *

UNITED STATES PATENT AND TRADEMARK OFFICE
CERTIFICATE OF CORRECTION

PATENT NO. : 6,598,650 B1 Page 1 of 1
DATED : July 29, 2003
INVENTOR(S) : Roger C. Palmer It is certified that error appears in the above-identified patent and that said Letters Patent is hereby corrected as shown below:

Column 10,
Line 20, please delete the phrase "The vane" and insert -- A vane -- therefore.

Signed and Sealed this

Eleventh Day of November, 2003

JAMES E. ROGAN
*Director of the United States Patent and Trademark Office*